(12) United States Patent
Tse

(10) Patent No.: US 6,994,221 B2
(45) Date of Patent: Feb. 7, 2006

(54) APPARATUS AND METHOD OF SEPARATING PLASTIC FILMS FROM GARBAGE FOR COLLECTION

(75) Inventor: Steven Tse, Room G08, Block 7, Kang Yuan, Guangzhou Country Garden, Dashi, Panyu, Guangzhou City, Guangdong, 511430 (CN)

(73) Assignee: Steven Tse, Guangzhou (CH)

( * ) Notice: Subject to any disclaimer, the term of this patent is extended or adjusted under 35 U.S.C. 154(b) by 272 days.

(21) Appl. No.: 10/436,109

(22) Filed: May 13, 2003

(65) Prior Publication Data
US 2004/0226864 A1 Nov. 18, 2004

(51) Int. Cl.
B07C 13/05 (2006.01)

(52) U.S. Cl. ............ 209/663; 209/930; 209/671; 209/688; 209/162; 209/165

(58) Field of Classification Search ................ 209/930, 209/663, 671, 688, 162, 165
See application file for complete search history.

(56) References Cited

U.S. PATENT DOCUMENTS

| | | | |
|---|---|---|---|
| 2,307,059 A * | 1/1943 | Moore ................ 209/665 |
| 3,568,839 A * | 3/1971 | Dunlea ................ 210/194 |
| 3,666,091 A * | 5/1972 | Ludlum ................ 209/44.1 |
| 3,817,458 A * | 6/1974 | Gilberto ................ 241/20 |
| 3,888,351 A * | 6/1975 | Wilson ................ 209/557 |
| 4,438,851 A * | 3/1984 | Voelskow ................ 209/616 |
| 4,813,618 A * | 3/1989 | Cullom ................ 241/79.1 |
| 5,588,534 A * | 12/1996 | Harel ................ 209/3.1 |
| 5,902,976 A * | 5/1999 | Beasley ................ 209/164 |
| 6,213,306 B1 * | 4/2001 | Fiedlschuster et al. ......... 209/3 |
| 2002/0074274 A1 * | 6/2002 | Peggs | |

* cited by examiner

Primary Examiner—Donald P. Walsh
Assistant Examiner—Jonathan R Miller
(74) Attorney, Agent, or Firm—Ware, Fressola, Van Der Sluys & Adolphson LLP (57) ABSTRACT

An apparatus and method capable of separating plastic films from garbage for collection is taking advantage of ductility of plastics, separation and extensibility properties of plastic films in water, and adhesion property of water to plastic films in order to provide a novel and unique garbage disposal implementation of rapidly, effectively, conveniently, and precisely separating medium-sized, light materials and plastic films from small garbage for collection and perform an initial cleaning of garbage by means of water while classifying garbage for facilitating a subsequent garbage disposal.

16 Claims, 6 Drawing Sheets

APPARATUS AND METHOD OF SEPARATING PLASTIC FILMS FROM GARBAGE FOR COLLECTION

BACKGROUND OF THE INVENTION

1. Field of the Invention

The present invention relates to garbage disposal and more particularly to an apparatus and method capable of rapidly, effectively separating pliable plastic films from garbage for collection.

2. Description of Related Art

As to garbage disposal, typically there are techniques, i.e., landfill and burning, widely used throughout the world. Many precious lands are used for landfill as more garbage is generated everyday. Underground water and soil may be polluted by buried garbage if an appropriate disposal is not done. As to burning, it can cause severe air pollution if smoke generated during burning is not well processed prior to discharge. As to generated ashes, they are buried after being generated. Hence, the problem of polluting underground water and soil still exists. Further, it is often that residents violently protest a garbage disposal site to be established in their neighborhood because they think it may degrade their living quality once established. Furthermore, the cost of disposing garbage is increased significantly as less land being available for landfill.

Resources on earth begin to deplete in recent years. Hence, more and more people are aware of the importance of resource recycling by actively cooperating with the resource recycling policy. It is desired that amount of garbage can be reduced significantly in a near future by successfully recycling resources in order to prolong a useful time of land for burying garbage and preserve limited resources on earth.

However, the typical resource recycling (i.e., garbage recycling) techniques are unsatisfactory now. For example, a satisfactory garbage classification is not possible by the typical resource recycling techniques mainly because a wide variety of different materials are contained in garbage. For example, particularly, plastic films, plastic bags, etc. are mixed with other materials in garbage. Hence, as compared with classification of other materials in garbage, a manual garbage disposal of plastic films is a more time consuming, tedious process. In addition, a wide variety of products are made of plastic materials. Also, thin plastic films, bags are often found in garbage. Preferably, thin plastic films, bags should be recycled independently. Otherwise, a lot of problems occur if thin plastic films, bags and other plastic products are mixed in garbage disposal for recycling. Unfortunately, these problems are found in the conventional garbage disposal. Hence, a need for improvement exists.

Thus, it is desirable to provide a novel apparatus and method of separating plastic films from garbage for collection by taking advantage of ductility of plastics, separation and extensibility properties of plastic films in water, and adhesion property of water to plastic films in order to overcome the above drawbacks of the prior art.

SUMMARY OF THE INVENTION

It is an object of the present invention to provide a method of separating plastic films from garbage for collection.

It is another object of the present invention to provide an apparatus of separating plastic films from garbage for collection.

Preferably, the method of the invention comprising the steps of:

(1) mixing garbage with water;

(2) removing heavy garbage sunk in water;

(3) separating light garbage and plastic films from the garbage while permitting organic matter and small garbage in water to pass through;

(4) separating medium-sized light garbage and plastic films from the garbage by conveying the garbage in a waterway to a driving inclined conveyor; and (5) picking up the plastic films from the waterway by, responsive to passing the plastic films under the inclined conveyor or dropping the plastic films into the waterway again via the inclined conveyor, conveying the plastic films along the waterway to reach a plastic film interception mechanism in the waterway for picking up the plastic films from the waterway and for separating the plastic films from the garbage still in the waterway.

Preferably, the step (3) of the invention comprises the sub-steps of:

pouring the garbage mixed with water into a conveyor screen assembly for passing tiny materials in the garbage through the conveyor screen assembly to fall onto the waterway;

activating an internal blower of the conveyor screen assembly to blow air toward a surface of the conveyor screen assembly to disengage light materials in the garbage not sifted from the conveyor screen assembly to fall into the waterway; and causing the plastic films adhered to the surface of the conveyor screen assembly to disengage therefrom at a discharge end of the conveyor screen assembly to fall into the waterway.

Preferably, the step (4) of the invention comprises the sub-steps of:

carrying the plastic films sent from the step (3) along the waterway to the inclined conveyor having a lower portion sunk in the waterway;

upwardly transporting the medium-sized light garbage and a floated portion of the plastic films along the inclined conveyor;

passing a submerged portion of the plastic films through an underside of the inclined conveyor;

dropping the medium-sized light garbage into a medium-sized garbage collection container for collection once reaching a discharge end of the inclined conveyor; and dropping the plastic films adhered to a surface of the inclined conveyor at the discharge end of the inclined conveyor to cause the plastic films to fall into the waterway by passing a gap between the discharge end of the inclined conveyor and a medium-sized garbage conveyor.

Preferably, the conveyor screen assembly of the invention comprises a plurality of meshed openings for causing the plastic films to extend thereon by contacting water to form a plurality of water dips, the plastic films being pressed by the water dips to adhere to the conveyor screen assembly so that the light materials in the garbage are blown out of the conveyor screen assembly to fall into the waterway by wind set up by the blower as the conveyor screen assembly continuously transports garbage forward and the plastic films are still adhered to the top surface of the conveyor screen assembly due to weight of the water dips despite wind blowing, and the conveyor screen assembly further comprises a first conveyor lower than the discharge end of the conveyor screen assembly and a shaft between the first conveyor and the discharge end of the conveyor screen assembly, the shaft including a plurality of equally spaced apart, arcuate, and axial revolving vanes on an outer surface thereof, responsive to the garbage reaching the discharge end of the conveyor screen assembly, large materials in the garbage being carried away by the revolving vanes of the shaft to fall onto the first conveyor for collection.

Preferably, the plastic film interception mechanism of the invention is a conveyor sieve at a downstream of the waterway so as to sift out the plastic films carried from the waterway for collection.

Preferably, he method of the invention comprising a washing step prior to intercepting the plastic films by conveying the intercepted plastic films to a flushing trough, activating a plurality of injection nozzles in the flush trough to spray water to the plastic films to wash dirt and oil stains on the plastic films away, and moving the plastic films in flushing water to a vessel for collection.

Preferably, the apparatus of the invention comprising:

a conveyor screen assembly for permitting small, light garbage and organic matter in garbage to pass through;

a waterway beneath and extended away from the conveyor screen assembly, the waterway including an injection nozzle for spraying water into the waterway;

an inclined conveyor at an intermediate section of the waterway, a lower end of the inclined conveyor being sunk in the waterway and the other higher end thereof being formed as a discharge;

a medium-sized garbage conveyor spaced apart and beneath the discharge of the inclined conveyor;

a medium-sized garbage collection container under a discharge end of the medium-sized garbage conveyor;

a plastic film interception mechanism at a downstream of the waterway, the plastic film interception mechanism being adapted to intercept the plastic films from the waterway; and a plastic film conveyor between a discharge end of the plastic film interception mechanism and the waterway, the plastic film conveyor being adapted to transport the plastic films.

Preferably, the conveyor screen assembly of the invention comprises an internal blower proximate a discharge end thereof, the blower being adapted to obliquely blow air toward a surface and the discharge end of the conveyor screen assembly, and an internal sprinkler assembly for upwardly spraying water toward the conveyor screen assembly.

Preferably, the conveyor screen assembly of the invention further comprises a first conveyor lower than the discharge end thereof and a first shaft above the first conveyor, the first shaft including a plurality of equally spaced apart, arcuate, and axial revolving vanes on an outer surface thereof, the first shaft being spaced apart from the discharge end of the conveyor screen assembly by a first gap and the first shaft being operative to rotate clockwise.

Preferably, the apparatus of the invention further comprising a second shaft between the discharge of the inclined conveyor and the medium-sized garbage conveyor, the second shaft including a plurality of equally spaced apart, arcuate, and axial revolving vanes on an outer surface thereof and the second shaft being operative to rotate clockwise.

Preferably, the plastic film interception mechanism of the invention comprises a closed second conveyor, a driven direction of the second conveyor being opposite to water flow in the waterway, a lower portion of the second conveyor being sunk in the waterway and a discharge end thereof being above the plastic film conveyor, and the second conveyor including a plurality of rows of hooks on a surface thereof for picking the plastic films up from water in the waterway.

Preferably, the apparatus of the invention, further comprising a flushing trough below a discharge end of the plastic film conveyor, the flushing trough including a plurality of injection nozzles for spraying water to the plastic films, and a plastic film collection container below a discharge opening of the flushing trough.

The above and other objects, features and advantages of the present invention will become apparent from the following detailed description taken with the accompanying drawings.

DETAILED DESCRIPTION OF THE PREFERRED EMBODIMENTS

Figure 1:
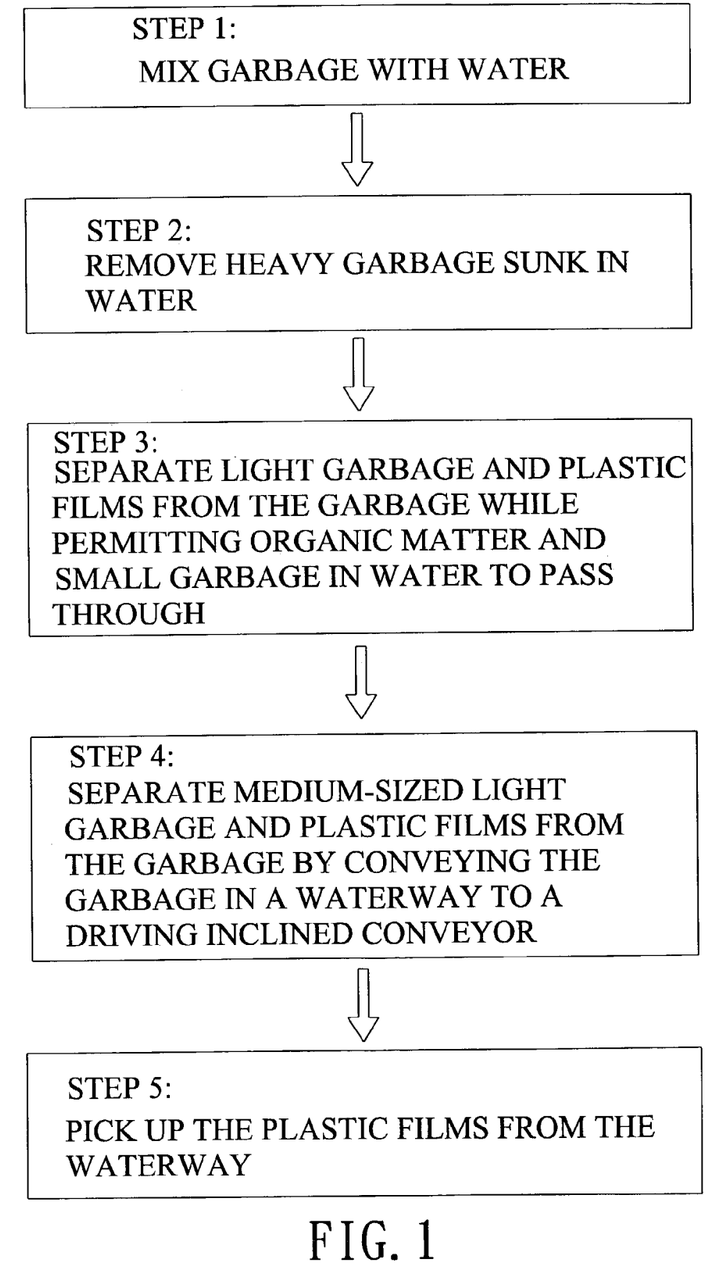
FIG. 1 is a flow chart showing a sequence of method steps performed by a first preferred embodiment of apparatus according to the invention.

Referring to FIG. 1, there is shown a sequence of method steps performed by a first preferred embodiment of apparatus of separating plastic films from garbage for collection (i.e., plastic film interception apparatus) in accordance with the invention.

In step 1, first mix garbage with water.

In step 2, remove heavy garbage (i.e., garbage sunk in water) from garbage.

In step 3, separate light garbage and plastic films from garbage while permitting organic matter and small garbage in water to pass through. In detail, pour garbage mixed with water into a conveyor screen assembly. Tiny materials in garbage (e.g., most being spoiled or waste food from a kitchen and a small portion being tiny floated articles) will pass through meshed openings of the conveyor screen assembly to fall onto a waterway thereunder. The garbage (including medium-sized garbage and plastic films) not sifted on the conveyor screen assembly is continuously transported forward. A phenomenon is found after pouring garbage mixed with water onto the conveyor screen assembly. The meshed opening of the conveyor screen assembly has an area of about 5 $cm^2$. The plastic films can extend on the conveyor screen assembly to form flat ones. Also, many water drops will accumulate on the plastic films to cause them to fall into the meshed openings of the conveyor screen assembly. As a result, a plurality of small water dips are formed on the conveyor screen assembly. Such dips will adhere the plastic films onto the conveyor screen assembly. Further, light materials in garbage are immediately blown out of the conveyor screen assembly to fall into the waterway by strong wind set up by a blower as the conveyor screen assembly continuously transports garbage forward. But the plastic films are still adhered to the top surface of the conveyor screen assembly due to weight of the dips despite the strong wind. The plastic films are further conveyed to a discharge end of the conveyor screen assembly. Once reaching the discharge end of the conveyor screen assembly (i.e., the beginning of reverse driven direction of the conveyor screen assembly), large materials having a size larger than 5 cm will contact and be carried away by revolving vanes of a first shaft to fall onto a first conveyor for collection.

It is important to note that a first gap S between the conveyor screen assembly and the first shaft is 5 cm. It is envisaged that only materials having a size less than about 2 cm will not contact and not be carried away by the vanes of the first shaft due to a forward thrust of the driving conveyor screen assembly. Also, pliable plastic films have a great adhesion once contacting water. Moreover, a plurality of small water dips are formed on the plastic films for adhering the plastic films onto the conveyor screen assembly. Hence, the plastic films will be continuously carried by the conveyor screen assembly until they reach the discharge end of the conveyor screen assembly. Once reaching the discharge end of the conveyor screen assembly, the plastic films begin drop off the conveyor screen assembly. The invention can carry out a collection of only clean plastic films because the plastic films are very thin (e.g., less than 0.5 cm in thickness). Occasionally, some materials may be adhered to the plastic films. In such a case these materials will contact and be carried away by the vanes of the first shaft, thereby preventing them from falling into the waterway. While a small number of tiny materials may fall into the waterway, they eventually will be sifted out in the subsequent process. For achieving this purpose, one or more stages may be contrived in the conveyor screen assembly for completely sifting out such tiny materials prior to permitting the garbage to flow into the waterway. A number of properties of plastic films are observed. For example, plastic films tend to extend in water, i.e., extensibility of plastic films in water. Most plastic films are submerged in water. Small organic matter will float on water while large materials will sink in water. Hence, most organic matter and small materials floated on water will pass through the meshed openings of the conveyor screen assembly while the plastic films will be sifted out to stay on the conveyor screen assembly. That is, water can be taken as a means for separating large particles from small ones. While some materials may be adhered to the plastic films, they eventually will be carried away by the vanes of the shaft. Hence, the invention can substantially sift out all nonrigid materials in garbage.

In step 4, separate medium-sized light garbage and plastic films from garbage by conveying garbage in water to a driving inclined conveyor. In detail, the medium-sized light garbage and the plastic films washed away from the conveyor screen assembly into the waterway will be conveyed by water to reach the inclined conveyor having a portion sunk in the waterway. Once the medium-sized light garbage and the plastic films reaching the inclined conveyor, light garbage and a portion of the plastic films floated on the waterway will be picked up for transporting by the driving inclined conveyor. As such, only submerged plastic films are remained in the waterway to continue to flow to a next stage after passing the underside of the inclined conveyor. As to the light garbage and the plastic films picked up by the inclined conveyor, they will adhere to a surface of the inclined conveyor due to water stayed thereon. Once reaching a discharge end of the inclined conveyor, medium-sized light garbage will transport to a medium-sized garbage collection container for collection via a medium-sized garbage conveyor. The plastic films adhered to the inclined conveyor will pass the discharge end of the inclined conveyor. Next, the plastic films fall into the waterway by passing a second gap between the discharge end of the inclined conveyor and the medium-sized garbage conveyor. The plastic films are then conveyed by water in the waterway to a next stage.

In step 5, pick up plastic films from waterway. In detail, once the plastic films have passed under the inclined conveyor or dropped into the waterway again by passing the inclined conveyor, the plastic films will be conveyed by water to reach a plastic film interception mechanism in the waterway. The plastic film interception mechanism is adapted to pick up the plastic films from the waterway for separating the plastic films from the garbage still in the waterway. The plastic film interception mechanism is implemented as a picking device including a closed second conveyor having a driven direction opposite to water flow in the waterway and a plurality of rows of hooks on the second conveyor. The hooks are capable of picking plastic films up from water in the waterway when the second conveyor is cyclically rotating and discharging the same when the picked up plastic films reach a discharge end of the second conveyor. Alternatively, the plastic film interception mechanism can be replaced by a conveyor sieve at a downstream of the waterway. The plastic films the plastic films in the waterway can be carried to the conveyor sieve by flow. Next, the plastic films are sifted out by the conveyor sieve. The sifted out plastic films are then transported to a plastic film collection container for collection. Moreover, a washing step can be performed prior to intercepting the plastic films. In detail, the plastic film interception mechanism is adapted to transport the intercepted plastic films to a flushing trough to be washed by strong water sprayed from injection nozzles at both side walls of the flushing trough. As such, dirt and oil stains stayed on the plastic films are removed. Eventually, move the plastic films in flushing water to a container for collection.

Figure 2:
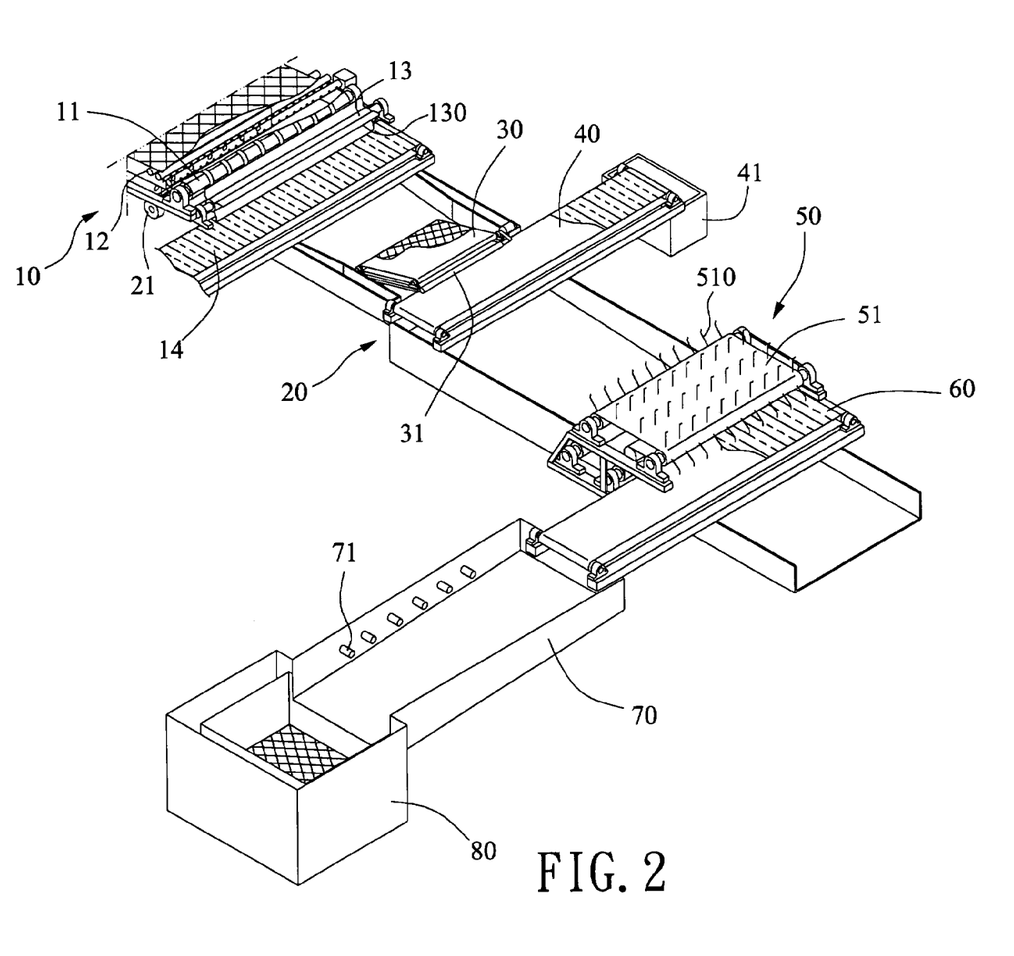
FIG. 2 is a perspective view of the apparatus of FIG. 1.
Figure 3:
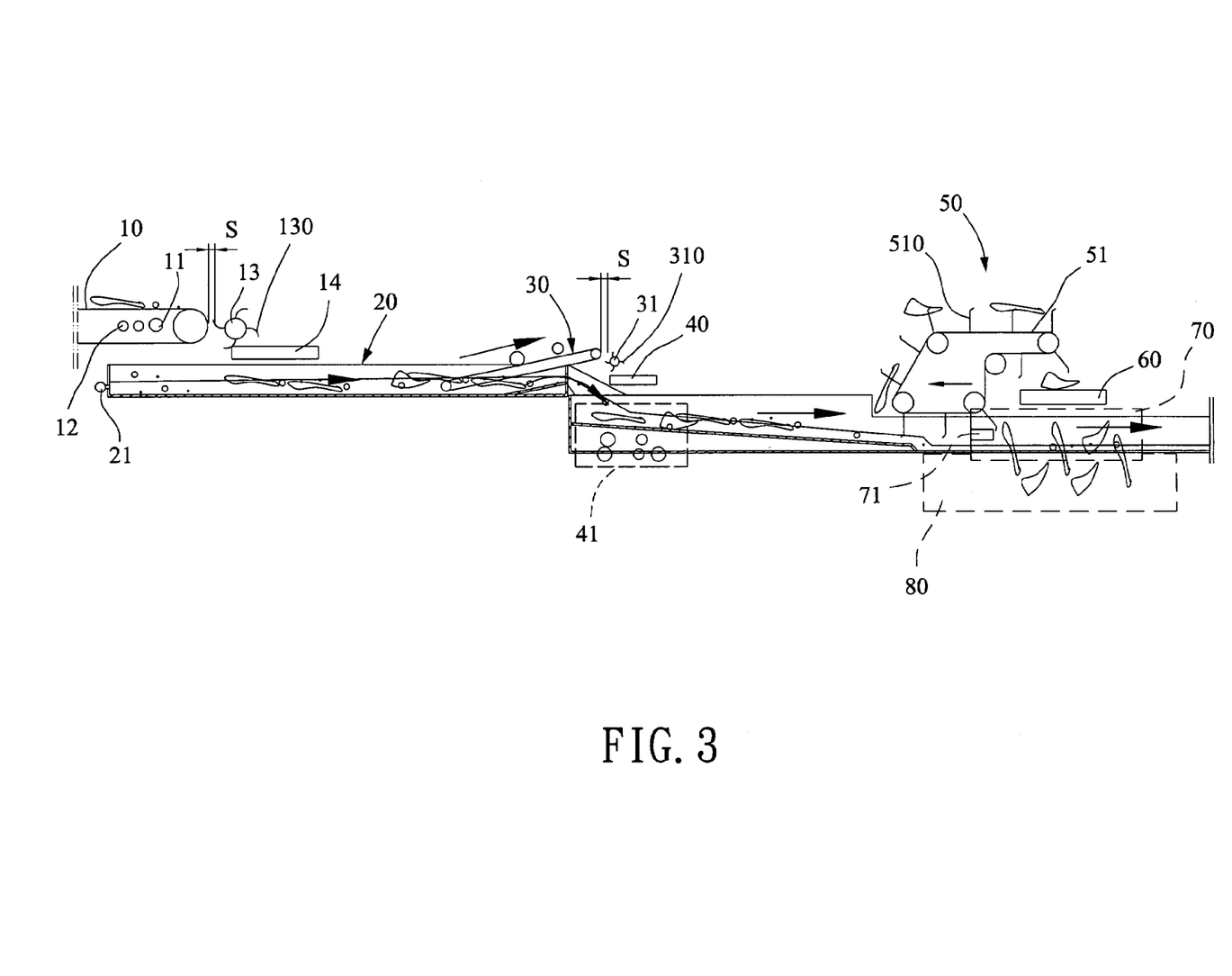
FIG. 3 is a side view of FIG. 2 schematically illustrating a garbage disposal flow performed by the apparatus.
Figure 4:
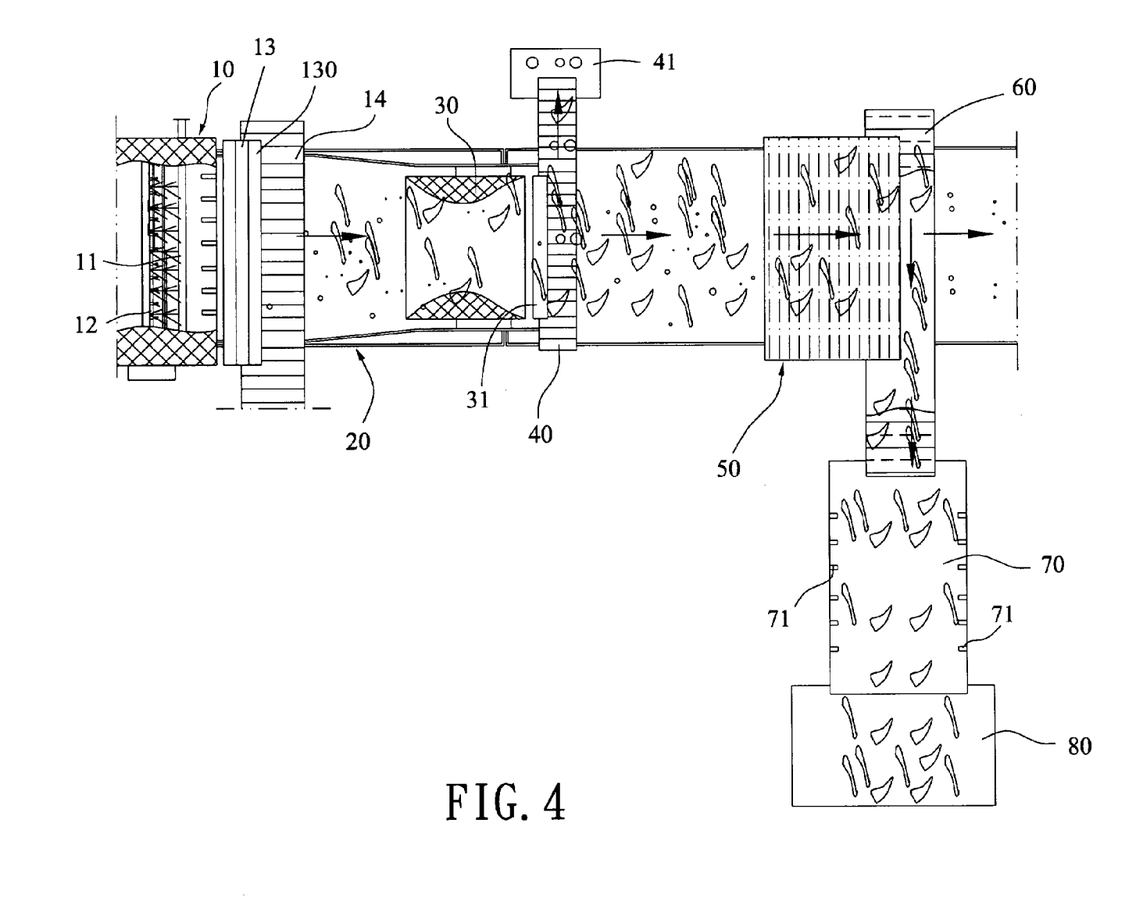
FIG. 4 is a top plan view of FIG. 2 schematically illustrating the garbage disposal flow.

Referring to FIGS. 2, 3, and 4, the first preferred embodiment of plastic film interception apparatus for carrying out the above method steps is shown. The apparatus comprises a conveyor screen assembly 10 for permitting small, light garbage and organic matter in garbage to pass through. The conveyor screen assembly 10 comprises a first shaft 13 including a plurality of equally spaced apart, arcuate, and axial revolving vanes 130 on its outer surface. The first shaft 13 can rotate clockwise. A first gap S of about 3 cm to about 10 cm is formed between a discharge end of the conveyor screen assembly 10 and the outermost point of the vane 130. The first gap S is adjustable. Preferably, the first gap S is 5 cm. The conveyor screen assembly 10 further comprises a first conveyor 14 lower than the first shaft 13, a waterway 20 beneath both the conveyor screen assembly 10 and the first conveyor 14, an internal blower 11 proximate the discharge end of the conveyor screen assembly 10, the blower 11 being adapted to obliquely blow air toward a surface and the discharge end of the conveyor screen assembly 10, and an internal sprinkler assembly 12 for upwardly spraying water toward the conveyor screen assembly 10.

An injection nozzle 21 is formed at a rear end of the waterway 20. The injection nozzle 21 is adapted to spray water into the waterway 20. The waterway 20 is further extended away from the discharge end of the conveyor screen assembly 10. The apparatus further comprises an inclined conveyor 30 at an intermediate section of the waterway 20, a lower end of the inclined conveyor 30 being sunk in the waterway 20 and the other higher end (i.e., discharge end) thereof being above the waterway 20, a medium-sized garbage conveyor 40 spaced apart and beneath the discharge end of the inclined conveyor 30, and a medium-sized garbage collection container 41 under a discharge end of the medium-sized garbage conveyor 40, and a second shaft 31 including a plurality of equally spaced apart, arcuate, and axial revolving vanes 310 on its outer surface. The second shaft 31 is located between the discharge end of the inclined conveyor 30 and the medium-sized garbage conveyor 40. The second shaft 31 can rotate clockwise. A second gap S of about 3 cm to about 10 cm is formed between the discharge end of the inclined conveyor 30 and the outermost point of the vane 310. The second gap S is also adjustable. The apparatus further comprises the following components. A plastic film interception mechanism is provided for intercepting plastic films from the waterway 20. The plastic film interception mechanism is implemented as a picking device 50 at a forward section (i.e., discharge opening) of the waterway 20. The picking device 50 comprises a Γ-shaped second conveyor 51. A driven direction of the second conveyor 51 is opposite to water flow in the waterway 20. Also, a lower portion of the second conveyor 51 is sunk in the waterway 20 so that a plurality of rows of hooks 510 on a surface of the second conveyor 51 are capable of picking plastic films up from water in the waterway 20 when a transfer belt of the second conveyor 51 is cyclically rotating. A plastic film conveyor 60 is provided between a discharge end of the picking device 50 and the waterway 20. A lengthwise direction of the plastic film conveyor 60 is perpendicular to that of the waterway 20. A flushing trough 70 is provided below a discharge end of the plastic film conveyor 60. A plurality of injection nozzles 71 are provided along both side walls of the flushing trough 70. A plastic film collection container 80 is provided below a discharge opening of the flushing trough 70. The plastic film collection container 80 has a plurality of meshed openings in a bottom for permitting water to flow through.

An operation of the invention of separating plastic films from garbage for collection will now be described below by referring to FIGS. 2 to 4 again. First mix garbage with water. Next, remove heavy garbage (i.e., garbage sunk in water) from garbage. Next, pour garbage mixed with water into the conveyor screen assembly 10. Small garbage will pass through meshed openings of the conveyor screen assembly 10 to fall onto the waterway 20 under the conveyor screen assembly 10. The garbage (including medium-sized garbage and plastic films) not sifted on the conveyor screen assembly 10 is continuously transported toward the first conveyor 14. The plastic films will extend on the transfer belt of the conveyor screen assembly 10 to form flat ones while the plastic films are still on the conveyor screen assembly 10. Also, many water drops will accumulate on the plastic films to cause them to fall into the meshed openings of the conveyor screen assembly 10. As a result, a plurality of small water dips are formed on the conveyor screen assembly 10. Such dips will adhere the plastic films onto the conveyor screen assembly 10. Further, light materials in garbage are immediately blown out of the surface of the conveyor screen assembly 10 to fall into the waterway 20 by strong wind set up by the blower 11 as the conveyor screen assembly 10 continuously transports garbage toward the first conveyor 14. But the plastic films are still adhered to the top surface of the conveyor screen assembly 10 due to weight of the dips despite the strong wind. The plastic films are further conveyed to the discharge end of the conveyor screen assembly 10. Prior to reaching this position (i.e., at the discharge end of the conveyor screen assembly 10), only the plastic films and other large materials in garbage are left on the conveyor screen assembly 10. Once reaching this position (i.e., the beginning of reverse driven direction of the transfer belt of the conveyor screen assembly 10), large materials having a size larger than the first gap S will contact the vanes 130. The revolving vanes 130 then carry them away to fall onto the first conveyor 14. As to the plastic films, they will fall into the waterway 20 by passing the first gap S due to their own weight. The plastic films are then conveyed by water in the waterway 20 to reach the inclined conveyor 30. Once the plastic films reaching the inclined conveyor 30, light garbage and a portion of the plastic films floated on the waterway 20 will be picked up for transporting by the driving inclined conveyor 30. As such, only submerged plastic films are remained in the waterway 20 to continue to flow to a next stage as detailed later after passing the underside of the inclined conveyor 30. As to plastic films picked up by the inclined conveyor 30, they will adhere to a surface of the inclined conveyor 30 due to water stayed thereon. Once reaching the discharge end of the inclined conveyor 30, medium-sized light garbage will drop onto the medium-sized garbage conveyor 40 by contacting the revolving vanes 310 of the second shaft 31. Next, the medium-sized garbage conveyor 40 conveys the medium-sized light garbage to the medium-sized garbage collection container 41 for collection.

Prior to reaching the discharge end of the inclined conveyor 30, the plastic films are still adhered to the surface of the inclined conveyor 30. Once reaching the discharge end of the inclined conveyor 30 (i.e., the beginning of reverse driven direction of the transfer belt of the inclined conveyor 30), the plastic films fall into the waterway 20 by passing the second gap S (between the discharge end of the inclined conveyor 30 and the second shaft 31 or the medium-sized garbage conveyor 40) due to their own weight. The plastic films are then conveyed by water in the waterway 20 to reach the picking device 50. Once the plastic films reaching the picking device 50, the submerged plastic films in the waterway 20 will be picked up by the hooks 510 of the driving second conveyor 51 submerged in the waterway 20. The picked up plastic films are then transported by the second conveyor 51 prior to falling onto the plastic film conveyor 60 by disengaging from the hooks 510 at a discharge end of the second conveyor 51. The plastic film conveyor 60 then carries the plastic films to the flushing trough 70. The injection nozzles 71 (see FIG. 4) in the flushing trough 70 will spray water to wash the plastic films into the plastic film collection container 80 for collection.

Figure 5:
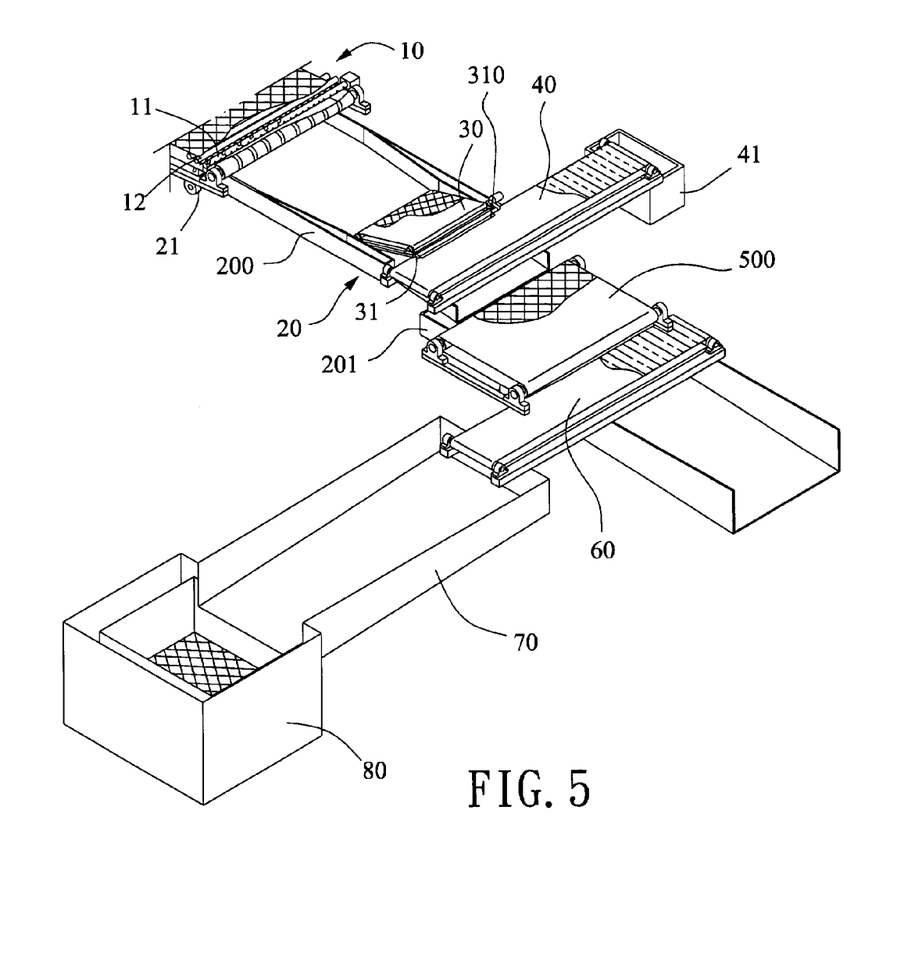
FIG. 5 is a perspective view of a second preferred embodiment of apparatus according to the invention.
Figure 6:
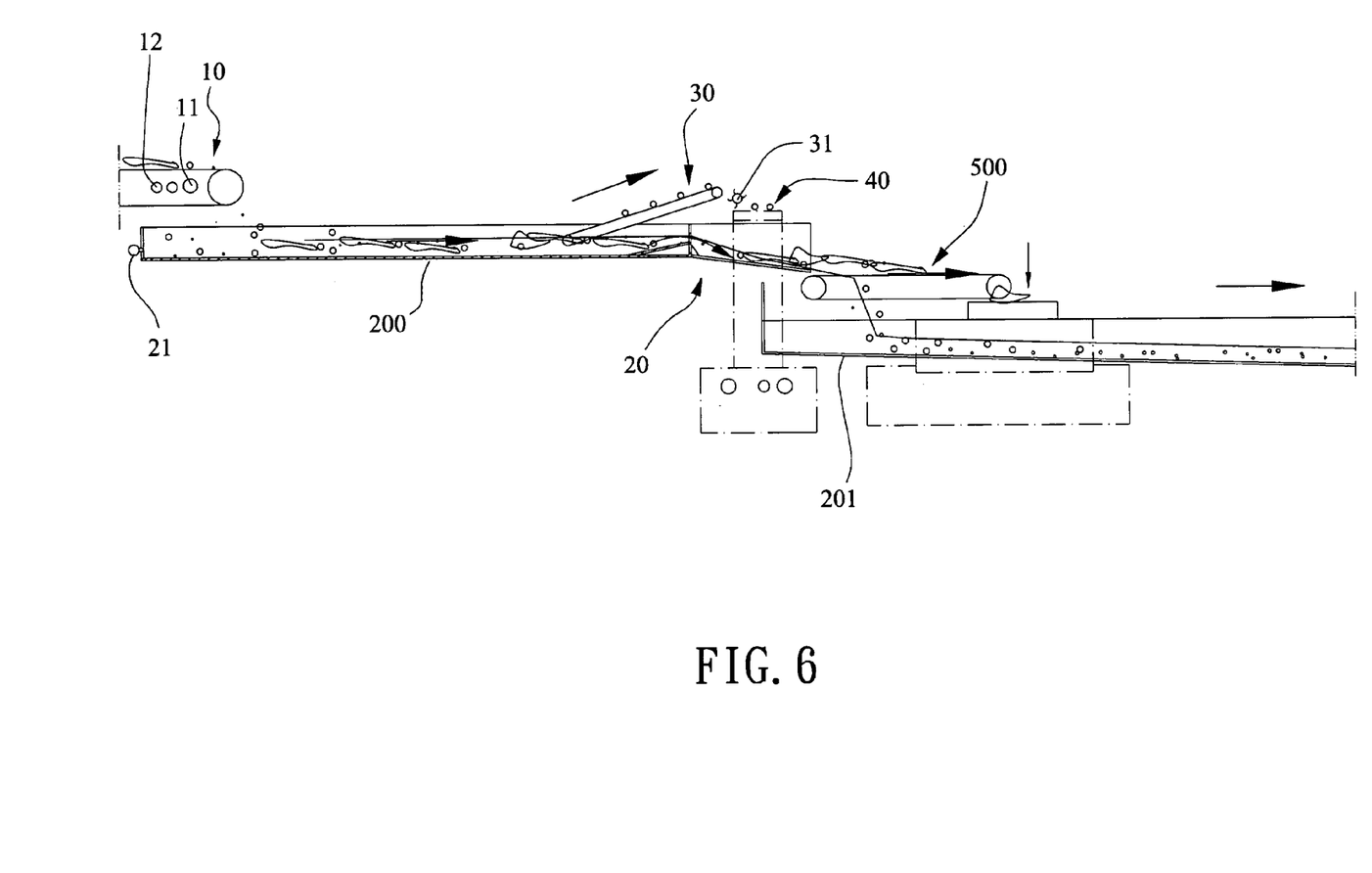
FIG. 6 is a side view of FIG. 5 schematically illustrating a garbage disposal flow performed by the second preferred embodiment of apparatus.

Referring to FIGS. 5 and 6, there is shown a second preferred embodiment of plastic film interception apparatus according to the invention. The second preferred embodiment is substantially the same as the first preferred embodiment. The differences between the first and the second preferred embodiments, i.e., the characteristics of the second preferred embodiment are detailed below. The waterway 20 is divided into a higher, first channel 200 and a lower, second channel 201. A conveyor sieve 500 is provided at a junction of the first and second channels 200, 201. A driven direction of the conveyor sieve 500 is the same as water flow in the waterway 20. As such, the plastic films in the first channel 200 can be carried to the conveyor sieve 500 by flow. Water will pass a plurality of meshed openings of the conveyor sieve 500 while the plastic films are sifted out by the conveyor sieve 500. The sifted out plastic films are then transported from the conveyor sieve 500 to the plastic film collection container 80 after passing the plastic film conveyor 60 and the flushing trough 70 sequentially.

It is to be particularly noted that as stated above, preferably, the first gap S between the conveyor screen assembly 10 and the first shaft 13 is 5 cm. It is envisaged that only materials having a size less than about 2 cm will not contact and not be carried away by the vane 130 of the first shaft 13 due to a forward thrust of the driving conveyor screen assembly 10. Also, pliable plastic films have a great adhesion once contacting water. Moreover, a plurality of small water dips water are formed on the plastic films for adhering the plastic films onto the conveyor screen assembly 10. Hence, the plastic films will be continuously carried by the conveyor screen assembly 10 until they reach the discharge end thereof (i.e., the beginning of reverse driven direction of the transfer belt of the conveyor screen assembly 10). Once reaching the discharge end of the conveyor screen assembly 10, the plastic films begin to drop off the conveyor screen assembly 10 to fall into the waterway 20. The invention can carry out a collection of only clean plastic films because the plastic films are very thin (e.g., less than 0.5 cm in thickness).

Occasionally, some materials may be adhered to the plastic films. In such a case these materials will contact and be carried away by the vanes 130 of the first shaft 13, thereby preventing them from falling into the waterway 20. While a small number of tiny materials may fall into the waterway 20, they eventually will be sifted out in the subsequent process. For achieving this purpose, one or more stages may be contrived in the conveyor screen assembly 10 for completely sifting out such tiny materials prior to permitting the garbage to flow into the waterway 20. Note that plastic films are difficult to recycle by the prior art technique. In contrast, following properties of plastic films are observed by the present inventor. In detail, plastic films tend to extend in water, i.e., extensibility of plastic films in water. Most plastic films are submerged in water. Small organic matter will float on water while large materials will sink in water. Hence, most organic matter and small materials floated on water will pass through the meshed openings of the conveyor screen assembly 10 while the plastic films will be sifted out to stay on the conveyor screen assembly 10. That is, water can be taken as a good means for separating large particles from small ones. While some materials may be adhered to the plastic films, they eventually will be carried away by the vanes of the shaft. Hence, the invention can substantially sift out all nonrigid materials in garbage.

The benefits of the invention include: (1) providing a novel and unique garbage disposal implementation of rapidly, effectively, conveniently, and precisely separating medium-sized, light materials and plastic films from small garbage for collection by means of water; (2) performing an initial cleaning of garbage by means of water while classifying garbage for facilitating a subsequent garbage recycling; (3) diluting toxic materials in garbage by means of water while classifying garbage for reducing a possibility of contracting diseases by people; and (4) providing an apparatus capable of effectively, rapidly, and precisely separating medium-sized, light materials and plastic films from garbage for collection.

While the invention herein disclosed has been described by means of specific embodiments, numerous modifications and variations could be made thereto by those skilled in the art without departing from the scope and spirit of the invention set forth in the claims.

What is claimed is:

1. A method of separating plastic films from garbage for collection comprising the steps of:
   (1) mixing garbage with water;
   (2) removing heavy garbage sunk in water;
   (3) separating light garbage including plastic films from the garbage while permitting organic matter and small garbage in water to pass through;
   (4) separating medium-sized light garbage and plastic films from the light garbage by conveying the light garbage in a waterway to a driving inclined conveyor; and
   (5) picking up the plastic films from the waterway by passing the plastic films under the inclined conveyor or dropping the plastic films into the waterway again via the inclined conveyor, conveying the plastic films along the waterway to reach a plastic film interception mechanism in the waterway for picking up the plastic films from the waterway and for separating the plastic films from the garbage still in the waterway.

2. The method of claim 1, wherein the step (3) comprises the sub-steps of:
   pouring the garbage mixed with water into a conveyor screen assembly for passing tiny materials in the garbage through the conveyor screen assembly to fall onto the waterway;
   activating an internal blower of the conveyor screen assembly to blow air toward a surface of the conveyor screen assembly to disengage light materials in the garbage not sifted from the conveyor screen assembly to fall into the waterway; and
   causing the plastic films adhered to the surface of the conveyor screen assembly to disengage therefrom at a discharge end of the conveyor screen assembly to fall into the waterway.

3. The method of claim 1, wherein the step (4) comprises the sub-steps of:
   carrying the plastic films sent from the step (3) along the waterway to the inclined conveyor having a lower portion sunk in the waterway;
   upwardly transporting the medium-sized light garbage and a floated portion of the plastic films along the inclined conveyor;
   passing a submerged portion of the plastic films through an underside of the inclined conveyor;
   dropping the medium-sized light garbage into a medium-sized garbage collection container for collection once reaching a discharge end of the inclined conveyor; and
   dropping the plastic films adhered to a surface of the inclined conveyor at the discharge end of the inclined conveyor to cause the plastic films to fall into the waterway by passing a gap between the discharge end of the inclined conveyor and a medium-sized garbage conveyor.

4. The method of claim 1, wherein the conveyor screen assembly comprises a plurality of meshed openings for causing the plastic films to extend thereon by contacting water to form a plurality of water dips, the plastic films being pressed by the water dips to adhere to the conveyor screen assembly so that the light materials in the garbage are blown out of the conveyor screen assembly to fall into the waterway by wind set up by the blower as the conveyor screen assembly continuously transports garbage forward and the plastic films are still adhered to the top surface of the conveyor screen assembly due to weight of the water dips despite wind blowing, and the conveyor screen assembly further comprises a first conveyor lower than the discharge end of the conveyor screen assembly and a shaft between the first conveyor and the discharge end of the conveyor screen assembly, the shaft including a plurality of equally spaced apart, arcuate, and axial revolving vanes on an outer surface thereof, responsive to the garbage reaching the discharge end of the conveyor screen assembly, large materials in the garbage being carried away by the revolving vanes of the shaft to fall onto the first conveyor for collection.

5. The method of claim 1, wherein the plastic film interception mechanism is a conveyor sieve at a downstream of the waterway so as to sift out the plastic films carried from the waterway for collection.

6. The method of claim 5, further comprising a washing step prior to intercepting the plastic films by conveying the intercepted plastic films to a flushing trough, activating a plurality of injection nozzles in the flush trough to spray water to the plastic films to wash dirt and oil stains on the plastic films away, and moving the plastic films in flushing water to a vessel for collection 7. The method of claim 1, further comprising a washing step prior to intercepting the plastic films by conveying the intercepted plastic films to a flushing trough, activating a plurality of injection nozzles in the flush trough to spray water to the plastic films to wash dirt and oil stains on the plastic films away, and moving the plastic films in flushing water to a vessel for collection.

8. An apparatus for separating plastic films from garbage for collection comprising:
- a conveyor screen assembly for permitting small, light garbage and organic matter in garbage to pass through;
- a waterway beneath and extended away from the conveyor screen assembly, the waterway including an injection nozzle for spraying water into the waterway;
- an inclined conveyor at an intermediate section of the waterway, a lower end of the inclined conveyor being sunk in the waterway and the other higher end thereof being formed as a discharge;
- a medium-sized garbage conveyor spaced apart and beneath the discharge of the inclined conveyor;
- a medium-sized garbage collection container under a discharge end of the medium-sized garbage conveyor;
- a plastic film interception mechanism at a downstream of the waterway, the plastic film interception mechanism being adapted to intercept the plastic films from the waterway; and
- a plastic film conveyor between a discharge end of the plastic film interception mechanism and the waterway, the plastic film conveyor being adapted to transport the plastic films.

9. The apparatus of claim 8, wherein the conveyor screen assembly comprises an internal blower proximate a discharge end thereof, the blower being adapted to obliquely blow air toward a surface and the discharge end of the conveyor screen assembly, and an internal sprinkler assembly for upwardly spraying water toward the conveyor screen assembly.

10. The apparatus of claim 8, wherein the conveyor screen assembly further comprises a first conveyor lower than the discharge end thereof and a first shaft above the first conveyor, the first shaft including a plurality of equally spaced apart, arcuate, and axial revolving vanes on an outer surface thereof, the first shaft being spaced apart from the discharge end of the conveyor screen assembly by a first gap and the first shaft being operative to rotate clockwise.

11. The apparatus of claim 9, wherein the conveyor screen assembly further comprises a first conveyor lower than the discharge end thereof and a first shaft above the first conveyor, the first shaft including a plurality of equally spaced apart, arcuate, and axial revolving vanes on an outer surface thereof, the first shaft being spaced apart from the discharge end of the conveyor screen assembly by a first gap and the first shaft being operative to rotate clockwise.

12. The apparatus of claim 8, further comprising a second shaft between the discharge of the inclined conveyor and the medium-sized garbage conveyor, the second shaft including a plurality of equally spaced apart, arcuate, and axial revolving vanes on an outer surface thereof and the second shaft being operative to rotate clockwise.

13. The apparatus of claim 8, wherein the plastic film interception mechanism comprises a closed second conveyor, a driven direction of the second conveyor being opposite to water flow in the waterway, a lower portion of the second conveyor being sunk in the waterway and a discharge end thereof being above the plastic film conveyor, and the second conveyor including a plurality of rows of hooks on a surface thereof for picking the plastic films up from water in the waterway.

14. The apparatus of claim 8, wherein the waterway comprises a higher, first channel and a lower, second channel, and further comprising a conveyor sieve at a junction of the first and the second channels.

15. The apparatus of claim 8, further comprising a flushing trough below a discharge end of the plastic film conveyor, the flushing trough including a plurality of injection nozzles for spraying water to the plastic films, and a plastic film collection container below a discharge opening of the flushing trough.

16. The apparatus of claim 14, wherein the plastic film collection container comprises a plurality of meshed openings in a bottom thereof.

* * * * *

UNITED STATES PATENT AND TRADEMARK OFFICE
CERTIFICATE OF CORRECTION

PATENT NO. : 6,994,221 B2 Page 1 of 1
DATED : February 7, 2006
INVENTOR(S) : Steven Tse It is certified that error appears in the above-identified patent and that said Letters Patent is hereby corrected as shown below:

Column 11,
Line 17, "claim 1" should be -- claim 5 --.

Signed and Sealed this

Thirtieth Day of May, 2006

JON W. DUDAS
*Director of the United States Patent and Trademark Office*